United States Patent [19]

McGrann et al.

[11] 4,437,351

[45] Mar. 20, 1984

[54] CONTROL STICK FORCE TRANSDUCER

[75] Inventors: Harold J. McGrann; John F. Orn; Matthew C. Pallaver, all of Phoenix, Ariz.

[73] Assignee: Sperry Corporation, NY, N.Y.

[21] Appl. No.: 253,415

[22] Filed: Apr. 13, 1981

[51] Int. Cl.$^3$ .......................... G01L 5/16; B64C 13/04

[52] U.S. Cl. .................................. 73/862.05; 244/236; 336/135

[58] Field of Search ...................... 73/862.05; 244/236; 336/40, 135

[56] References Cited

U.S. PATENT DOCUMENTS

| | | | |
|---|---|---|---|
| 2,866,333 | 12/1958 | Dudenhausen | 73/862.05 |
| 2,895,086 | 7/1959 | Pettit | 244/236 |
| 3,434,342 | 3/1969 | Kazmarek | 73/862.05 |
| 3,447,766 | 6/1969 | Palfreyman | 73/862.05 |
| 3,729,990 | 5/1973 | Oliver | 73/862.05 |

*Primary Examiner*—Howard A. Birmiel
*Attorney, Agent, or Firm*—Howard P. Terry

[57] ABSTRACT

In combination with a control stick having a grip handle, a control stick force transducer includes a flexure means having a pair of parallel plates, one secured to the grip handle and one secured to the control stick and at least three compliant columns interconnecting said plates and forming at least three parallelograms disposed in vertical planes so that the one plate deflects relative to the other in accordance with rectilinear forces applied thereto but is insensitive to any moments applied thereto through the control handle. The force transducer further includes inductive pick-off means designed to be insensitive to moments applied to the handle about its vertical axis and a suspended mass and lever means pivoted relative to said columns so as to produce equal and opposite forces on the grip handle to compensate for the acceleration forces acting thereon.

9 Claims, 7 Drawing Figures

CONTROL STICK FORCE TRANSDUCER

BACKGROUND OF THE INVENTION

1. Field of the Invention

The present invention relates to aircraft control devices and more particularly to aircraft control stick force transducers.

2. Description of the Prior Art

VTOL (vertical takeoff and landing) aircraft which derive their VTOL capability by the directed thrust of turbojet engines are characterized as being extremely unstable in their hover-to-forward flight and forward flight-to-hover and landing modes, thereby requiring a high sensitivity stability or control augmentation system for safe operation. The high sensitivity of such a pilot augmented stability augmentation system requires a control stick having a control stick force transducer that is sensitive only to control forces or commands that the pilot consciously intends to apply to the control stick to produce pitch and roll maneuvers. Therefore, the force transducer should be insensitive to inadvertent or unconscious grip handle moments about these axes as well as the vertical axis and also insensitive to acceleration forces to which the grip may be subject.

Control stick force transducers are of course not broadly new, but known prior art attempts to develop control stick force transducers have resulted in devices that can be characterized as being overly sensitive to the acceleration of the grip handle or overly sensitive to a moment at the point of force; such as when in applying a linear force to the grip, the pilot unintentionally applies a wrist twist moment. Many prior art control stick force transducers which are moment sensitive are counterbalanced about a pivot point to eliminate linear acceleration sensitivity, whereas control stick force transducers which are acceleration sensitive are designed to minimize moment sensitivity.

The control stick force transducers which is described in U.S. Pat. No. 3,729,990, issued May 1, 1973, to the Applicants' assignee may be characterized as being not only of the acceleration sensitive type but also of the type that is moment sensitive about the vertical axis. The control stick force transducer disclosed therein utilizes a first array of cantilevered mode beams and unidirectional pick-off means arranged to sense sheer forces in a first direction but not in a second direction orthogonal to the first direction and a second array arranged to sense sheer forces in the second direction but not in the first direction. With this arrangement, moments about the vertical axis will couple into from the individual arrays and produce undesired output signals. Since the control stick force transducer does not include a grip handle compensation mass, the control stick transducer is also unduly sensitive to any longitudinal or lateral aircraft acceleration forces acting on the grip handle producing undesirable signal outputs.

The control stick force transducer described in U.S. Pat. No. 2,895,086, issued on July 14, 1959, to the Applicants' assignee, is of a type which may be characterized as being moment sensitive. In the illustrated embodiment of that invention, the deflection of a pivoted member that is attached to the manual grip member is measured from a null position by a suitable electrical transducer which provides an electrical output signal proportional in direction and magnitude to any force tending to pivot the pivoted grip member. While the control stick force transducer is not sensitive to acceleration forces acting on the grip handle, it is unduly sensitive to unintentional moments applied about the pivot point such as those produced by unintentional twisting of the pilot's wrist.

Accordingly, there is a need for a more effective control stick force transducer which can be particularly useful in stability augmentation systems and which is moment insensitive about all its axes of motion and insensitive to acceleration forces acting on the grip.

SUMMARY OF THE INVENTION

The apparatus of the present invention provides a control stick force transducer of the type which is coupled between the grip handle portion and the lower portion of a control stick. The force transducer includes moment insensitive flexure means having preferably at least four, but a minimum of three, compliant columns disposed between a pair of relatively stiff parallel plates to define four parallelograms in planes parallel to the vertical axis of the transducer. The upper plate is coupled to the grip handle portion of the control stick and the lower plate is coupled to the lower portion of the control stick whereby the grip handle may be deflected in all lateral directions. The control stick force transducer further includes a mass balancing apparatus for counterbalancing acceleration forces acting on the grip handle. Inductive pick-off means designed to be insensitive to twisting moments about the vertical axis is disposed between the parallel plates for measuring only the longitudinal and lateral deflection of the compliant columns, and thereby providing output signals which are representative of only the intentional control forces applied to the grip handle.

DESCRIPTION OF THE PREFERRED EMBOIMENTS

Figure 1:
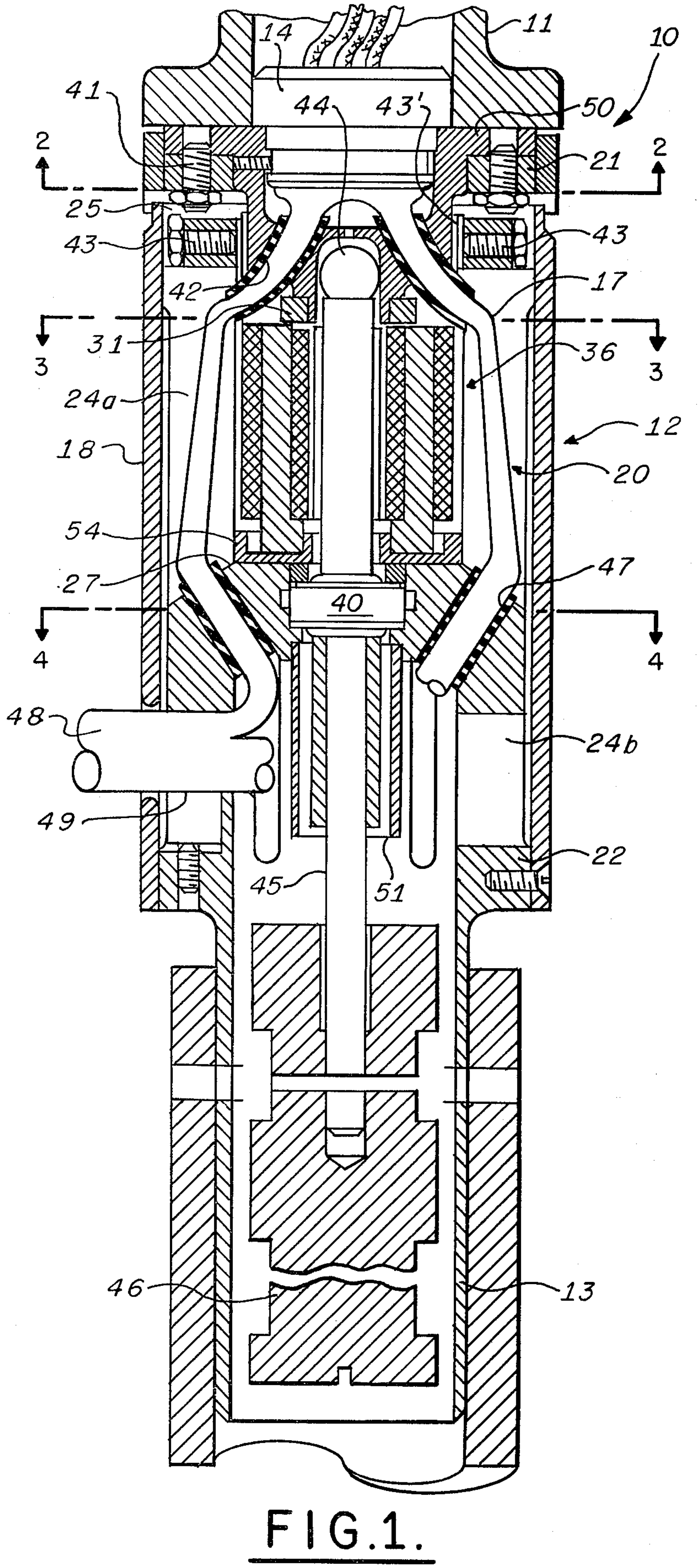
FIG. 1 is a vertical cross sectional view of the control stick force transducer of the present invention.
Figure 2:
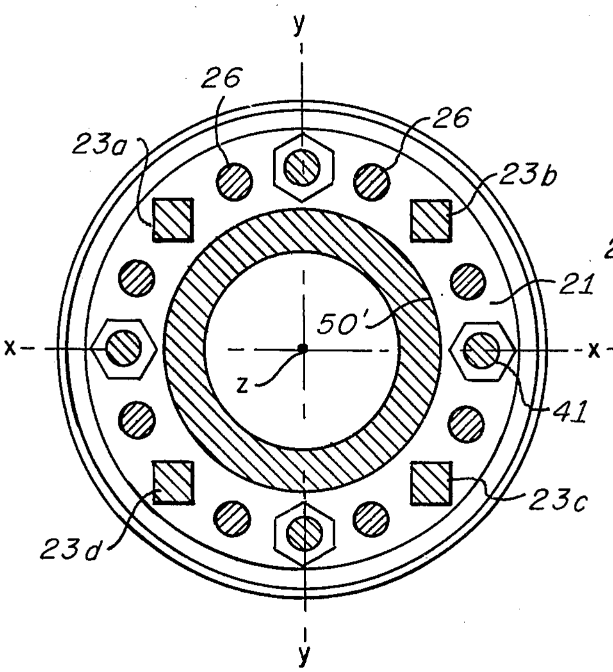
FIGS. 2, 3 and 4 are cross sectional views of the control stick force transducer taken on lines 2—2, 3—3, and 4—4 of FIG. 1.
Figure 3:
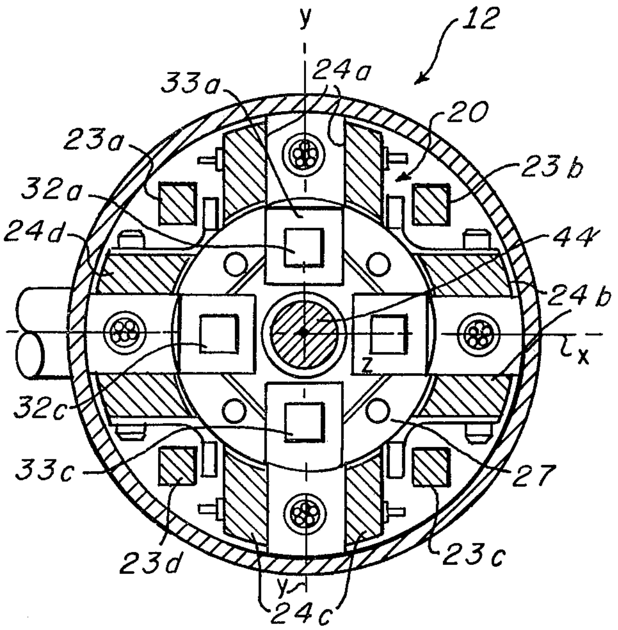
Figure 4:
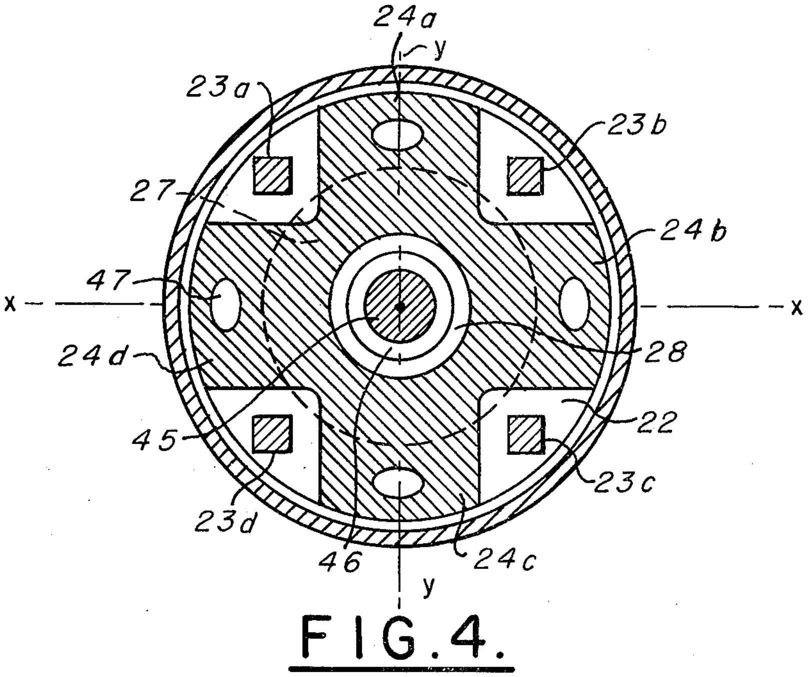

Referring now to FIG. 1, a vertical cross sectional view of a control stick force transducer 10 is provided. FIGS. 2–4 show progressive cross sections through the depth of the transducer 10. The control stick 10 includes a grip handle portion 11, control stick force transducer 12, and a lower control stick portion 13. The grip handle portion 11 typically includes a conventional pistol type grip (not shown) for comfortably supporting the pilot's hand and may further include electrical switching means (not shown) for actuating armament systems, actuating trim controls, disconnecting automatic flight controls, etc. Wires 15 for these various switches are connected to a suitable plug and receptical connector 14 having wire bundles 17 extending into and through flexure assembly means 20 of the control stick force transducer 12.

The flexure means 20 is preferably machined from a single piece of material such as, for example, berylium copper, stainless steel, aluminum, or suitable composite materials. Machining the flexure means from a single piece of material prevents any hysteresis effects which could occur if it were fabricated from several pieces and then fastened together with fasteners. The flexure means 20 is comprised of substantially rigid upper plate 21 and lower plate 22 disposed in parallel, horizontal planes and having four compliant columns, 23*a*, 23*b*, 23*c* and 23*d* disposed in parallel vertical planes and connecting the upper and lower plates. Preferably, each of the compliant columns 23*a–d* have generally square cross section, although rectangular or circular cross sections are satisfactory depending upon the application or design, which together with the plates 21 and 22 form four parallelograms lying in four vertical planes. The sides of the columns and the sides of the parallelograms are preferably parallel to each other and are also preferably parallel to the fore-aft or longitudinal aircraft axes x—x and athwartship or lateral axis y—y and the length of the columns is parallel to the vertical aircraft axis z—z as shown in FIG. 2. It will be appreciated that while the preferred embodiment discloses four columns, only three are required to provide the desired results.

Figure 6:
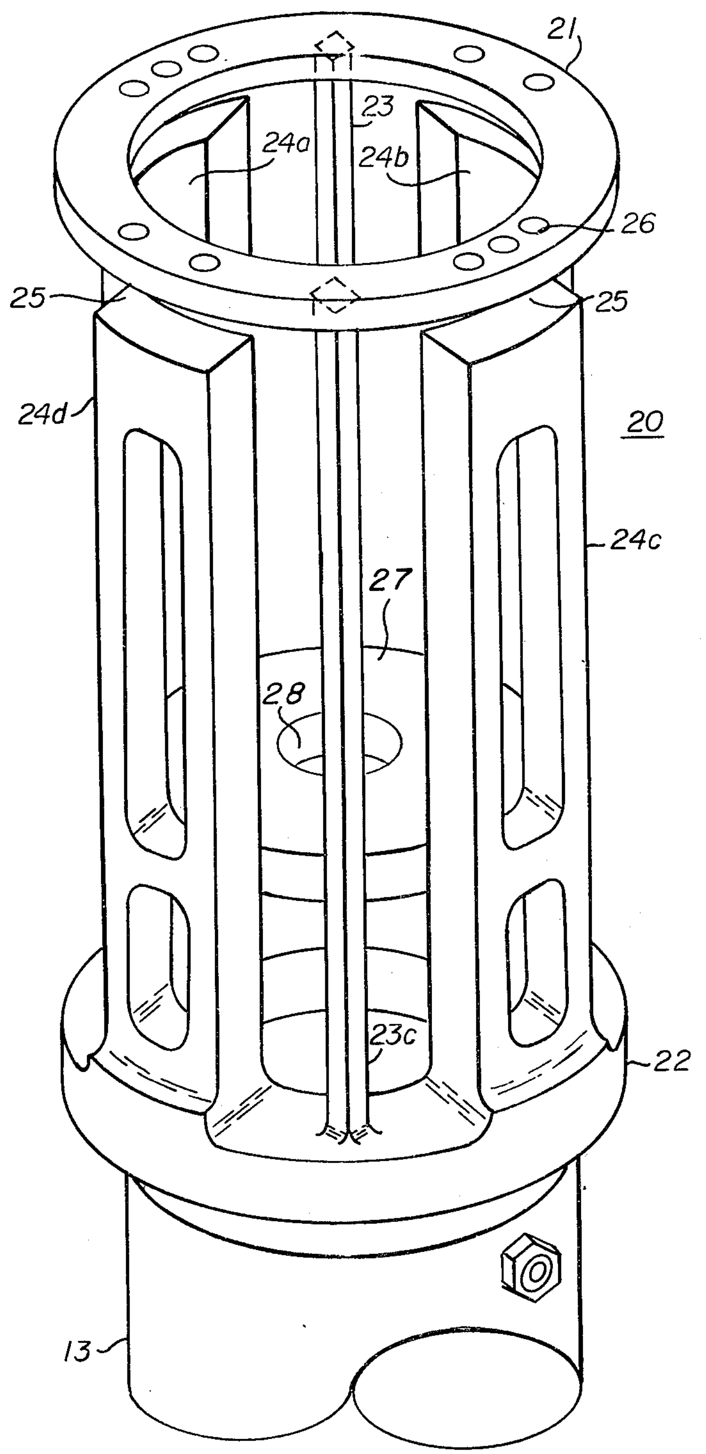
FIG. 6 is a perspective view of the control stick force transducer body.

The flexure assembly further includes four substantially rigid apertured support columns 24*a*, 24*b*, 24*c* and 24*d* which extend from the lower plate 22 and terminate just below the upper plate 21 thereby forming a small gap 25 between the upper plate 21 and the support columns 24. The supports 24 further include an integral platform 27 disposed between lower plate 22 and upper plate 21 and which includes an aperture 28 in its center. The upper plate 21 includes drilled and threaded holes 26 for securing the grip handle portion 11 of the control stick 10 to the control stick force transducer 12. A perspective view of the transducer assembly showing the features described above is shown in FIG. 6.

Still referring to FIGS. 1–4, it can be appreciated that flexure means 20 of the control stick force transducer 12 is provided with a protective cover 18 and is secured between the upper portion of the support columns 24 and the lower plate 22. The upper plate 21 is provided with holes 26 which are drilled and tapped to received adjustable stop screws 41 which act to limit handle deflection and prevent possible buckling of the columns 23*a–d*. The screws 41 are preferably parallel with the z axis and when the flexure means 20 is deflected, the screws 41 abut the upper face of rigid supports 24 to thereby prevent the compliant columns 23*a–d* from buckling due to compression loads generated by any overloads in the principal x—x, y—y axes. A stop insert 50, which is connected to the upper plate 21 by screws, extends into the open center 50' of the upper plate 21. The stop insert 50 is provided with holes 42 which provide passage for the wire bundles 17 from the electrical connector 14. The upper ends of supports 24*a–d* are drilled and tapped to receive threaded adjustable stop screws 43. These adjustable stops 43 are arranged on the principal axes x—x, y—y and provide protection of the transducer along these principal axes against pilot induced forces on the control handle in excess of a predetermined value. It will be noted that a thin sleeve 43' rigidly surrounding the insert 50 and having holes opposite the screws 43 is provided. The holes are slightly larger than the diameter of the screw stops and thereby provide additional stop surfaces for limiting any excessive twisting or torque loads imposed on the control handle about its vertical axis z.

The bottom of the stop insert 50 includes a vertically extending cylindrical hole adapted to receive a ball 44 formed on the upper end of an axially extending pivot arm 45, the lower portion of which is threaded into a mass 46 located below the platform 27. The pivot arm 45 is journalled universally, as by a spherical bearing 46, in the rigid intermediate platform 27. The weight of mass 40 times the length of the lower lever arm of pivot arm 45 is selected to just balance the weight of the control handle 11 times the length of the upper lever arm of the pivot arm 45 whereby longitudinal and lateral acceleration forces on the mass 46 cancel such acceleration forces on the control handle 11, thereby rendering the transducer insensitive to acceleration forces.

The wire bundles 17 from connector 14 are passed down through the apertured support columns 24*a–d* (FIG. 2), jointed with the transducer pick-off conductors, then passed through holes 47 in platform 27 (FIG. 4) and thence are collected into a single cable 48 and passed through a suitable opening 49 in the control stick. A shield 51 surrounding the lower extension of pivot rod 45 prevents any interference between the wire bundles and rod 45.

Platform 27 has a flat annular surface at its upper end to provide support for the stator core and coils of the pick-off means 36 of the force transducer to be further described below in connection with FIG. 5. As shown in FIGS. 1 and 3, the core/coil assembly is secured, as by a suitable adhesive to a mounting plate 54 which in turn is accurately positioned and secured, again by adhesive, to the annular surface of the platform 27. The circular or annular armature 31 of the pick-off is similarly secured to the lower end of the insert 50, surrounding the ball 44 by a cylindrical receiving hole therein.

Figure 5:
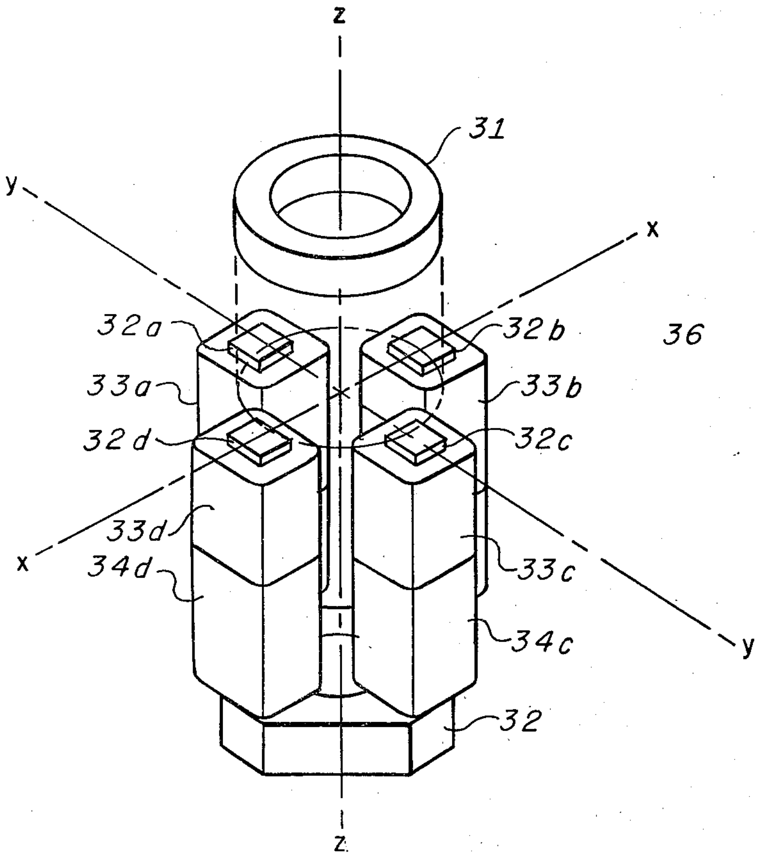
FIG. 5 is an illustration of the inductive pick-off means of the control stick force transducer; and FIG. *5a* is a schematic of the inductive pick-off means circuit.

Referring now to FIG. 5, an illustrative view of the inductive pick-off means 36 is provided. The inductive pick-off means 36 is preferably comprised of a circular armature 31 and a cruciform core member 32 having four projections 32*a*, 32*b*, 32*c*, 32*d* aligned parallel to the vertical or z—z axis of the transducer and the projections have in turn four primary coils 34*a*, 34*b*, 34*c*, 34*d* and four secondary coils 33*a*, 33*b*, 33*c*, 33*d*. In FIG. 5, the x—x axis may be parallel to the aircraft fore-aft axis and the y—y axis may be parallel to the aircraft lateral axis as shown. The inductive pick-off 36 is substantially different from the "E" type pick-off of U.S. Pat. No. 2,408,770 and the variable reluctance type of U.S. Pat. No. 2,895,086 both assigned to the present assignee. The present pick-off eliminates the conventional common core and excitation winding but operates on the same differential or variable area principle as the '770 patent as opposed to the differential or variable gap principle of the '086 patent. Distributing the excitation winding on the individual core elements eliminates the common central core and thereby permits the pivot shaft 45 to pass through the space otherwise occupied thereby. Furthermore, in accordance with the present invention, by providing a circular armature 31, the output of the pick-off is effectively insensitive to any torsional motion of the hand grip 11 inadvertently or unconsciously imported by the pilot twisting his wrist.

Figure 5A:
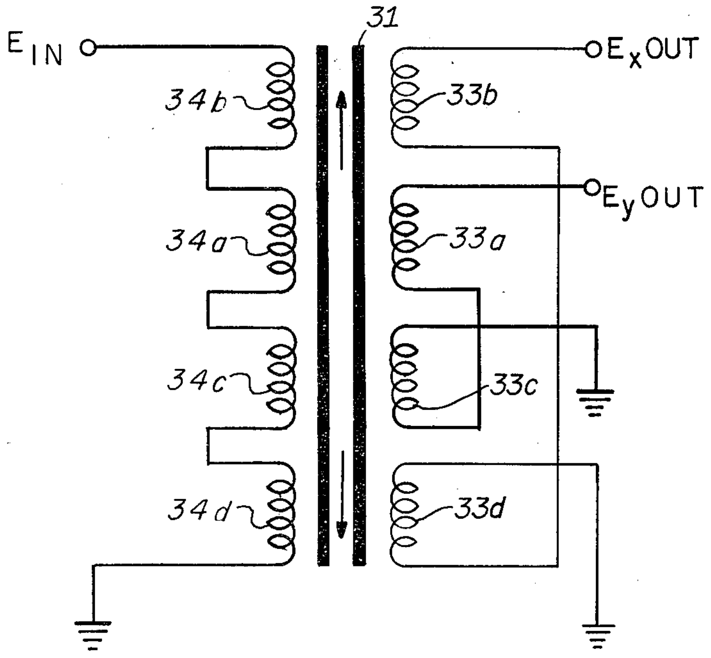

Referring now to FIG. 5*a*, an electrical schematic depicts the relationship between the armature 31, the primary coil 34*a*, 34*c* and the secondary coils 33*a*, 33*c*, for example. It should be noted that the relationship between the armature 31, the remaining primary coils, and the remaining secondary coils is identical. Thus, it can be seen that a first tap on primary 34$b$ is coupled to an alternating current source 39 and a second tap on primary coil 34$d$ is coupled to an input tap on primary coil 34$c$ and a second tap on primary coil 34$c$ is coupled for example, to ground. A first tap on the secondary coil 33$c$ is coupled to ground and a second tap on the coil 33$c$ is coupled to an input tap on the secondary coil 33$a$. An output tap on the secondary coil 33$a$ provides an output signal $E_{out}$ indicative of the displacement of the armature 31; i.e., its overlap, relative to the end faces of poles 32$a$, 32$c$ in the Y direction. Thus, the motion of the armature 31 in one direction or the other increases or decreases the magnetic flux through the secondary coils 33$a$, 33$c$, thereby providing a phase sensitive, variable amplitude output signal proportional to the force applied by the pilot in overcoming the flexure load imposed by the flexure columns 23$a$–$d$.

It will be appreciated that the force transducer of the present invention while designed to provide an output signal linearly proportional (with limits) to pilot induced force for control systems requiring such proportional signal, may also function as a force switch for control systems requiring a discrete signal when a predetermined control stick force is applied by the pilot.

It will not be appreciated that when the pilot applies a force to the grip handle portion 11 by, for example, pulling back the grip handle to command an aircraft pitch up maneuver, the parallelogram flexure means 20 deflects, permitting relative lineal displacement between upper and lower plates 21, 22, respectively. Since there is no rotary pivot point for the grip handle 11, all of the pilot-applied load or force is used to deflect the flexure means 12 along the x axis, thereby making the flexure means 12 substantially wholly insensitive to any moment or torque resulting from any indavertent or unconscious twisting of the grip. Similarly, if the grip handle portion 11 is moved left or right commanding a corresponding aircraft roll maneuver, a similar torque- or moment-insensitive deflection will occur. It should be noted, however, that the grip handle portion 11 would be sensitive to linear acceleration forces whenever such acceleration forces are applied to the grip handle unless compensated for. Counterbalancing mass 46 suspended by a pivot arm 45, pivoted in plate 27 and extending to universal coupling 44 on the control handle plate is provided to alleviate any acceleration sensitivity. Thus, if an acceleration force acts on the grip handle, the flexure means 12 tends to deflect as a result thereof. However, the same acceleration force acts on the mass 46 and tends to displace it. These two forces are summed through the arm 45 at its pivot connection 46 and mutually cancel rendering the flexure substantially wholly insensitive to the acceleration forces on the grip handle portion.

It will be appreciated that the force transducer of the present invention, while disclosed herein as incorporated in an aircraft control stick, is also adaptable to an aircraft control wheel. Also, while the acceleration compensation mass as disclosed in the preferred embodiment is located below the lower plate and coupled through its pivot rod with the upper plate, it will be appreciated that the mass and its pivot couple be located above the upper plate or even between the upper and lower plates depending upon the requirements of a specific design.

While the invention has been described in its preferred embodiments, it is to be understood that the words which have been used are words of description rather than of limitation and that the changes within the purview of the appended claims may be made without departing from the true scope and spirit of the invention in its broader aspects.

We claim:

1. A zero-moment force transducer apparatus adapted for use with an aircraft manual control member and disposed between a grip handle portion and lower portion of a control member and disposed along a normally vertical axis, comprising:

a first plate connected with said grip handle portion;

a second plate spaced apart from said first plate and connected with said lower control portion; said first and second plates being disposed in normally parallel horizontal planes and normally aligned along said vertical axis;

at least three elongated laterally compliant columns connecting said first plate with said second plate and which together therewith define at least three parallelogram configurations disposed in planes parallel with said vertical axis and each column having compliances such that one of said plates may be reflected relative to the other in all lateral directions upon corresponding forces being applied to said one plate;

a platform disposed intermediately of said first and second plates;

a common inductive pick-off means having a first part connected with said first plate and a second part mounted on said platform and connected with said platform for providing output signals representative of said relative lateral deflection of said plates in response to lateral forces applied to said grip handle portion, said pick-off further being substantially non-respective to moments about said vertical axis, and an acceleration responsive mass and pivoted rod means connected with said mass, said rod means coupled with said first plate for inducing forces on said first plate to compensate for corresponding acceleration forces acting on said grip handle portion.

2. Apparatus as in claim 1, wherein said second part of said inductive pick-off means comprises cruciform core and coil means further comprising:

first coil means for generating a reference signal;

second coil means, inductively coupled to said first coil means, for sensing at least one of said lateral deflections;

said first part of said electrical pick-off means comprising circular armature means for variably inductively coupling said first and second coil means so that said second coil means is urged to supply a phase sensitive variable output signal proportional to said lateral deflection, and wherein said circular armature means is normally symmetrically disposed relative to said core means whereby said output signal is substantially insensitive to any twisting motion about said vertical axis.

3. The apparatus as set forth in claim 2 wherein said cruciform core means includes a plurality of elongated pole means, said pole means extending parallel to said compliant columns, for inductively coupling said first and second coil means to said circular armature means, and wherein said first and second coil means comprise a primary coil portion and a secondary coil portion respectively mounted on each of said elongated pole means.

4. The apparatus as set forth in claim 2 wherein the periphery of said circular armature normally symmetrically overlaps said end faces of said pole means.

5. The apparatus as set forth in claim 1 wherein said mass is disposed below said second plate and wherein said pivoted rod means is pivoted at a point intermediately of said plates.

6. The apparatus according to claim 1 which further includes a plurality of substantially rigid supports mounted on one of said plates and extending generally parallel to said columns and including stop means cooperable with the other of said plates for limiting said lateral deflection of said one plate.

7. The apparatus as set forth in claim 6 wherein said rigid support means further includes said platform means disposed intermediately of said plates and wherein said rod means is pivoted in said platform means.

8. The apparatus as set forth in claim 6 wherein said first and second plates, said compliant columns, said rigid support means and said platform means comprise an integral structure fabricated from a single blank of material.

9. The apparatus as set forth in claim 2 wherein said cruciform core means includes an opening therein and wherein said pivoted rod means extends through said opening.

* * * * *

UNITED STATES PATENT AND TRADEMARK OFFICE
CERTIFICATE OF CORRECTION

PATENT NO. : 4,437,351

DATED : March 20, 1984

INVENTOR(S) : H. J. McGann, J. F. Orn & M. C. Pallaver

It is certified that error appears in the above-identified patent and that said Letters Patent is hereby corrected as shown below:

On the title page, line [75], the first inventor's name should read: Harold J. McGann.

Signed and Sealed this

*Thirtieth* Day of *April 1985*

[SEAL]

*Attest:*

DONALD J. QUIGG

*Attesting Officer* *Acting Commissioner of Patents and Trademarks*